US 6,904,286 B1

(12) United States Patent
Dantu (10) Patent No.: US 6,904,286 B1
(45) Date of Patent: Jun. 7, 2005

(54) METHOD AND SYSTEM OF INTEGRATED RATE CONTROL FOR A TRAFFIC FLOW ACROSS WIRELINE AND WIRELESS NETWORKS

(75) Inventor: Ramanamurthy Dantu, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 653 days.

(21) Appl. No.: 09/908,225

(22) Filed: Jul. 18, 2001

(51) Int. Cl.[7] ............................................. H04Q 7/20
(52) U.S. Cl. ................... 455/452.2; 455/522; 455/450; 455/67.11; 455/517
(58) Field of Search ..................... 455/414.2, 422.1, 455/446, 445, 452.2, 450, 453, 456.3, 517 522, 63.1, 67.11, 67.13, 115.1, 115.3; 370/356, 394

(56) References Cited

U.S. PATENT DOCUMENTS

| | | | |
|---|---|---|---|
| 5,257,283 A | 10/1993 | Gilhousen et al. .............. 375/1 |
| 5,293,640 A | 3/1994 | Gunmar et al. ............. 455/33.1 |
| 5,301,359 A | 4/1994 | Van den Heuvel et al. 455/56.1 |
| 5,561,839 A | * 10/1996 | Osterberg et al. ........... 455/446 |
| 5,603,085 A | 2/1997 | Shedlo ....................... 455/33.1 |
| 5,666,356 A | 9/1997 | Fleming et al. ............. 370/328 |
| 5,734,967 A | 3/1998 | Kotzin et al. ................. 455/63 |
| 5,745,480 A | 4/1998 | Behtash et al. ............. 370/252 |
| 5,768,260 A | 6/1998 | Lindgren et al. ........... 370/252 |
| 5,805,585 A | 9/1998 | Javitt et al. ................. 370/342 |
| 5,862,485 A | 1/1999 | Linneweh, Jr. et al. ...... 455/450 |
| 5,923,650 A | 7/1999 | Chen et al. ................. 370/331 |
| 5,987,326 A | 11/1999 | Tiedemann, Jr. et al. ... 455/442 |
| 5,995,805 A | 11/1999 | Ogasawara et al. ........ 455/13.1 |
| 6,021,309 A | 2/2000 | Sherman et al. ........... 455/12.1 |
| 6,052,594 A | * 4/2000 | Chuang et al. .............. 455/450 |
| 6,070,084 A | 5/2000 | Hamabe ...................... 455/522 |
| 6,157,668 A | 12/2000 | Gilhousen et al. .......... 375/130 |
| 6,161,309 A | 12/2000 | Cook .......................... 370/328 |
| 6,181,738 B1 | 1/2001 | Chheda et al. |
| 6,226,283 B1 | 5/2001 | Neumiller et al. |
| 6,289,005 B1 | 9/2001 | Katz ........................... 370/328 |
| 6,304,562 B1 | 10/2001 | Kim et al. ................... 370/332 |
| 6,324,185 B1 | 11/2001 | Budhraja .................... 370/468 |
| 6,327,254 B1 | 12/2001 | Chuah ......................... 370/328 |
| 6,347,224 B1 | 2/2002 | Smyth et al. ................ 455/406 |
| 6,608,826 B1 | * 8/2003 | Mesecher et al. ........... 370/342 |
| 6,628,629 B1 | * 9/2003 | Jorgensen ................... 370/322 |
| 6,678,267 B1 | * 1/2004 | Anandakumar et al. .... 370/356 |

FOREIGN PATENT DOCUMENTS

| | | | | |
|---|---|---|---|---|
| EP | 0 831 669 A2 | 3/1998 | ........... H04Q/7/38 |
| EP | 0 841 763 A1 | 5/1998 | ........... H04B/7/26 |
| EP | 1 041 850 A1 | 10/2000 | ........... H04Q/7/38 |
| WO | WO 98/45966 | 10/1998 | ........... H04B/7/24 |
| WO | WO 98/52288 | 11/1998 | ........... H04B/1/00 |
| WO | WO 99/53630 | 10/1999 | ........... H04B/7/005 |

OTHER PUBLICATIONS

G. Holland and N.H. Vaidya, "Impact of Routing and Link Layers on TCP Performance in Mobile Ad Hoc Networks," IEEE Wireless Communications and Networking Conference (WCNC), Oct., 1999.

(Continued)

Primary Examiner—Nay Maung
Assistant Examiner—John J. Lee
(74) Attorney, Agent, or Firm—Baker Botts L.L.P.

(57) ABSTRACT

A method and system of integrated rate control for a traffic flow extending across wireline and wireless networks includes determining a power indicator for a wireless link of a traffic flow between a source and a mobile device. Delivery of a feedback message generated by the mobile device is shaped based on the power indicator for the wireless link to control the source transmit rate of the traffic flow.

30 Claims, 4 Drawing Sheets

OTHER PUBLICATIONS

G. Holland and N.H. Vaidya, "Analysis of TCP Performance over Mobile Ad Hoc Networks," Fifth Annual ACM/IEEE International Conference on Mobile Computing and Networking (MOBICOM), Aug., 1999.

S. Biaz and N. Vaidya, "Discriminating Congestion Losses from Wireless Losses using Inter–Arrival Times at the Receiver," IEEE Symposium Application–Specific Systems and Software Engineering Technology (ASSET), Mar., 1999.

B. Bakshi, et al., "Improving Performance of TCP over Wireless Networks," IEEE 17th International Conference on Distributed Computing Systems, May, 1997.

*Data Networks,* Bertsekas et al., 1987.

"On the Capacity of a Cellular CDMA System," Gilhousen et al., *IEEE* 1991, 10 pages.

"Erlang Capacity of a Power Controlled CDMA System," Viterbi et al., *IEEE* 1993, 9 pages.

Timothy Ju and Gary Ogasawara, "Congestion Control By Traffic Shaping for Ground/Satellite Network," XP–002140800, Milcom '97 Proceedings, Nov. 2–5, 1997, 5 pages.

U.S. Appl. No. 09/174,273, entitled "Method and Apparatus for Class Based Transmission Control of Data Connections Based on Real–Time External Feedback Estimates Obtained Using Messaging from a Wireless Network," filed Oct. 16, 1998, 35 pages.

U.S. Appl. No. 09/466,308, entitled "Method and System for Allocating Bandwidth in a Wireless Communications Network," filed Dec. 17, 1999, 85 pages.

U.S. Appl. No. 09/513,914, entitled "Wireless Router and Method for Processing Traffic in a Wireless Communications Network," filed Feb. 25, 2000, 87 pages.

U.S. Appl. No. 09/513,913, entitled "Method and System for Managing Transmission Resources in a Wireless Communications Network" filed Feb. 25, 2000, 73 pages.

U.S. Appl. No. 09/513,090, entitled "Method and System for Configuring Wireless Routers and Networks," filed Feb. 25, 2000, 94 pages.

U.S. Appl. No. 09/513,592, entitled "Method and System for Brokering Bandwidth in a Wireless Communications Network," filed Feb. 25, 2000, 50 pages.

U.S. Appl. No. 09/513,912, entitled "Method and System for Queuing Traffic in a Wireless Communications Network," filed Feb. 25, 2000, 94 pages.

CA*net II Differentiated Services. Bandwidth Broker System Specification, British Columbia Institute of Technology, Technology Centre, Group for Advanced Information Technology, http://www.interrnet2.edu/qos/gbone/QB BAC.shtml, Online 4 Oct. 1998, XP–002136418, 13 pages, printed Apr. 25, 2000.

U.S. Appl. No. 09/591,077, entitled "Method and System for Dynamic Soft Handoff Resource Allocation in a Wireless Network," filed Jun. 9, 2000, 66 pages.

"TCP and Explicit Congestion Notification," Floyd, Lawrence Berkeley Laboratory, DE–AC03–76SF00098, 16 pages.

* cited by examiner

METHOD AND SYSTEM OF INTEGRATED RATE CONTROL FOR A TRAFFIC FLOW ACROSS WIRELINE AND WIRELESS NETWORKS

TECHNICAL FIELD OF THE INVENTION

This invention relates generally to the field of wireless communications, and more particularly to a method and system of integrated rate control for a traffic flowing across wireline and wireless networks.

BACKGROUND OF THE INVENTION

Transport control protocol/Internet protocol (TCP/IP) is a connection oriented protocol used by wireline and wireless networks to transmit traffic. TCP provides rate control between end points of a connection through the use of acknowledgment messages fed back from a receiving end point to a transmitting end point. TCP rate control, however, is problematic for connections over wireless networks due to the limited bandwidth and transmission losses of wireless links.

SUMMARY OF THE INVENTION

The present invention provides a method and system of integrated rate control for a traffic flow across wireline and wireless networks that substantially reduce or eliminate problems and disadvantages associated with previous systems and methods. In a particular embodiment, the present invention shapes rate control feedback to a wireline source of a flow extending over a wireless link based on conditions of the wireless link to provide integrated traffic management.

In accordance with a particular embodiment of the present invention, a method and system of integrated rate control for a traffic flow includes determining a power indicator for a wireless link of a traffic flow between a source and a mobile device. Delivery of a feedback message generated by the mobile device is shaped based on the power indicator for the wireless link to control the source transmit rate of the traffic flow.

More specifically, and in accordance with particular embodiments of the present invention, the feedback message may be a transport control protocol (TCP) packet delivery acknowledgement message. The power indicator may be a signal power of the mobile device and/or an error rate to signal interference ratio for the wireless link.

Technical advantages of the present invention include providing integrated rate control for flows across wireline and wireless networks. In particular, transmission rate control messages for a traffic flow are shaped based on conditions of a wireless link for the flow. As a result, transport control or other suitable transport protocols comprehend all layers of the network. Thus, bandwidth utilization is optimized and interference minimized within the wireless network.

Another technical advantage of the present invention includes providing sector and/or location based flow controls. In particular, flows terminating at a particular location or in a particular sector of the wireless network are ganged together and commonly controlled to effect or result in a substantially constant traffic flow for the sector and minimized sector burstyness.

Still another technical advantage of the present invention includes providing packet-level treatment for sector-specific and/or channel-specific power control. The pocket-level response provides robust control which may manage flows from various types of wireless devices and types of applications, such as bursty, interactive, real-time, download, mobile and the like. The control system may also handle loss and delay sensitive applications.

The various embodiments of the present invention may include all, some or none of the enumerated advantages. Furthermore, other advantages of the present invention will be readily apparent to one skilled in the art from the following figures, descriptions and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
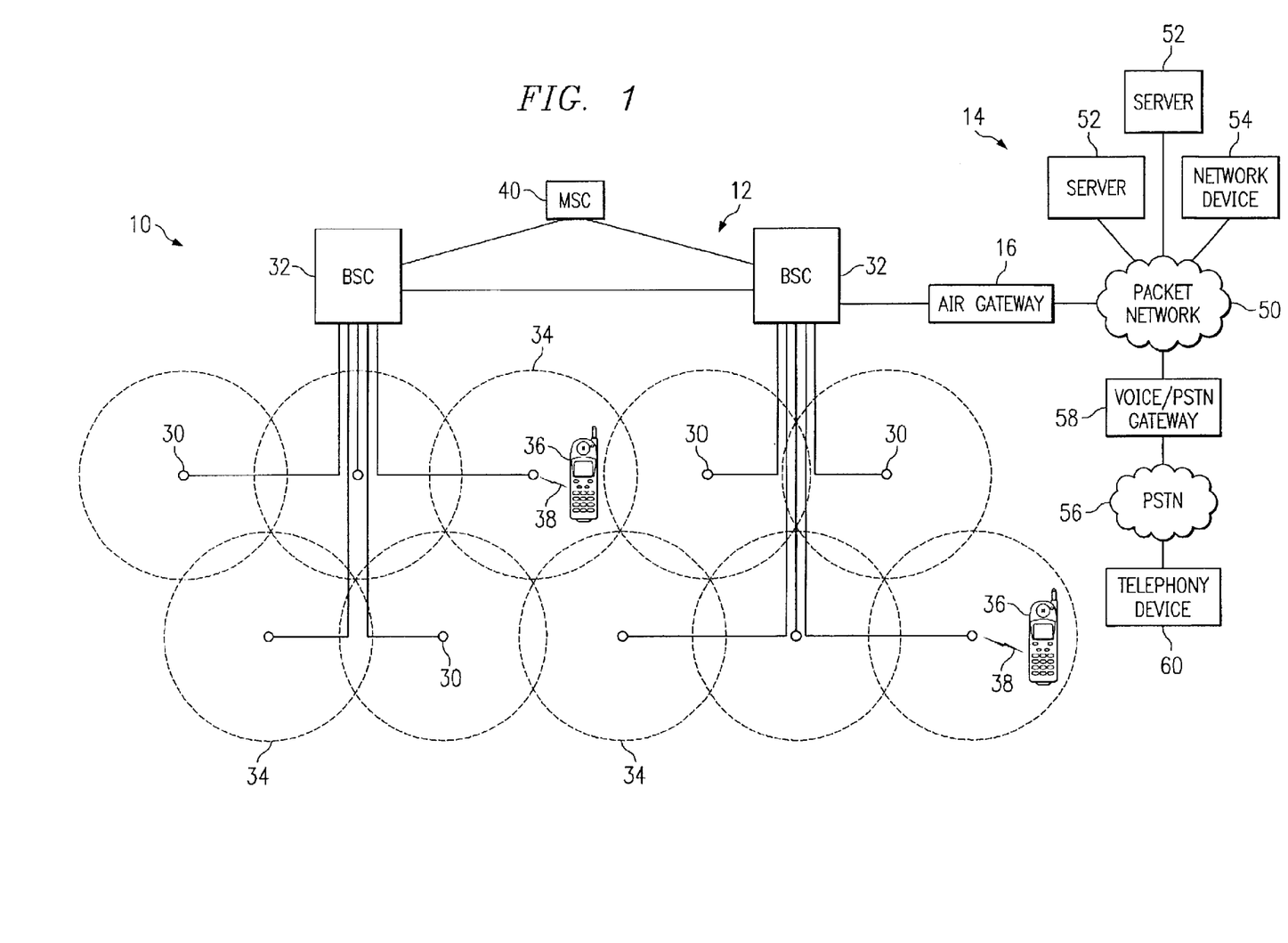
FIG. 1 is a block diagram illustrating a communication system in accordance with one embodiment of the present invention.

FIG. 1 illustrates a communication system 10 in accordance with one embodiment of the present invention. In this embodiment, the communication system 10 includes a cellular wireless network in which terrestrial wireless transmissions originate in geographically delimited cells. It will be understood that the present invention may be used in connection with other suitable wireless networks.

Referring to FIG. 1, the communication system 10 includes a wireless network 12 connected to a wireline network 14 through an air gateway 16. The air gateway 16 separates signaling and bearer traffic and may also convert traffic between the wireless and wireline domains. In particular embodiments, the air gateway 16 may comprise a packet data serving node (PDSN) for CDMA or CDMA 2000 or comprise a signaling gateway server node (SGSN) for universal mobile telecommunications systems (UMTS). The air gateway 16 may have a router/switch that directs traffic in the bearer plane between the wireless and wireline networks 12 and 14. Connectivity between the wireless and wireline networks 12 and 14 may be provided via circuit switched and packet switched wireless data protocols. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region, section or cell 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the air gateway 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout, or roam the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable core transport network 50 connecting a number of servers 52 and other network devices 54 to each other and to the air gateway 16. The packet network 50 also connects the air gateway 16, and thus the wireless network 12 to the public switched telephone network (PSTN) 56 through a voice/PSTN gateway 58. Accordingly, mobile devices 36 may communicate through wireless network 12, packet network 50 and PSTN 56 with standard telephones, clients and computers using modems or digital subscriber line (DSL) connections or other telephony devices 60.

The data transport network 50 may be the Internet, intranet, extranet, or other suitable local or wide area network capable of communicating information between remote end points. For the Internet embodiment, information is transmitted in Internet protocol (IP) packets using transport control protocol (TCP). WDP, user datagram protocol (UDP) and other suitable protocols and formats may also be used. It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS) domain name servers (DNS), content servers including web sites and pages, push servers and other suitable servers and functionality providing services to mobile devices 36 and/or to wireless and/or wireline connections in the communications system 10. The network devices 54 may also be a server or any other suitable device connectable to the packet network 50 and operable to provide content over the network. For example, the network device 54 may be a communication device, a web hosting device or a client device.

The servers 52 and/or other elements of the wireless or wireline networks 12 and 14 store subscriber level information for users of the wireless and/or wireline networks 12 and 14. The service level information includes service, quality and/or service level agreement (SLA) parameters for user connections as well as rate and other subscription information. In a particular embodiment, the air gateway 16 stores or accesses SLA databases including a QoS policy and rate information for each user. The QoS identifies a class of service (CoS) for user connections, such as drops, delays, jitters and other limits for the user connections.

Figure 2:
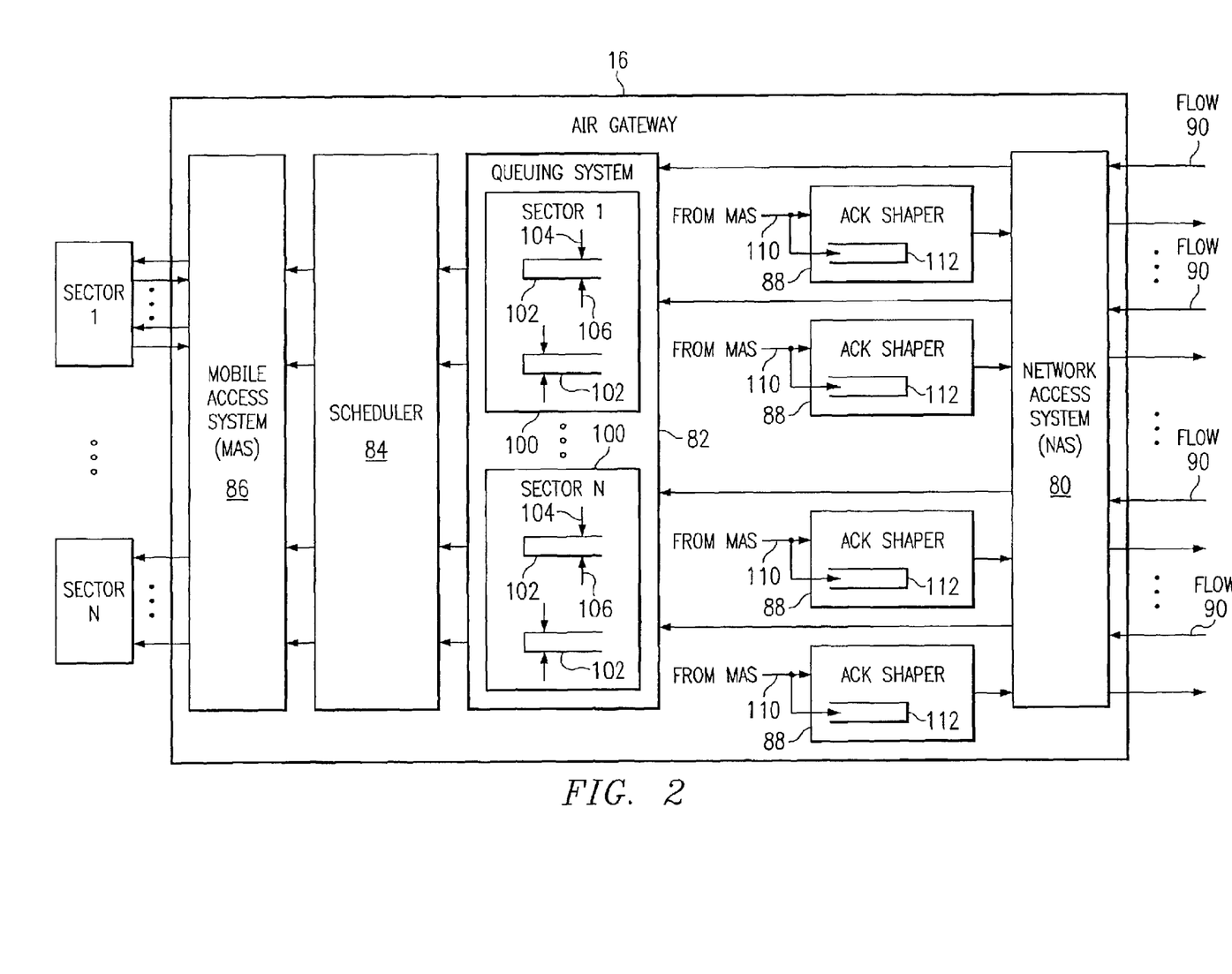
FIG. 2 is a block diagram illustrating details of the air gateway of FIG. 1 in accordance with one embodiment of the present invention.

FIG. 2 illustrates details of the air gateway 16 in accordance with one embodiment of the present invention. In this embodiment, the mobile devices 36 in the wireless network 12 communicate with servers and/or network devices 52 and 54 using TCP. It will be understood that the mobile devices may communicate using UDP, WDP and other suitable protocols in which rate control feedback for a flow is received at a source end point from a receiving end point and used by the source end point to adjust traffic transmission rates.

Referring to FIG. 2, the air gateway 16 includes a network access system (NAS) 80, a queuing system 82, a scheduler 84 and a mobile access system (MAS) 86. The air gateway 16 also includes an acknowledgment shaper 88 for each traffic flow. As used herein, each means every one of at least a subset of the identified items.

The NAS 80, queuing system 82, scheduler 84, MAS 86, acknowledgment shapers 88 as well as other components of the communication system 10 may comprise logic encoded in media for performing functionality of the air gateway 16 and/or other elements of the system. The logic comprises functional instructions for carrying out programmed tasks. The media comprises computer disk or other computer-readable media, application specific integrated circuits (ASIC), field programmable gate arrays (FPGA), digital signal processors (DSP), and other suitable specific or general purpose processors, transmission media or other suitable media in which logic may be encoded and utilized. In addition, the logic may be integrated into a program or device or may be distributed between programs media types and/or discreet devices.

The NAS 80 is coupled to the transport network 50. The NAS 80 receives packets from the network 50 in flows, or channels 90, processes the packets and forwards the packets to an appropriate queue in the queuing system 82. In one embodiment, the NAS 80 labels each packet for routing in the wireless network 12. In this embodiment, the NAS 80 may use multiple protocol label switch (MPLS) or other suitable labels and may remark nonconforming packets outside the SLA, QoS and/or CoS of the corresponding flow.

The queuing system 82 includes sector queues 100 that each include a queue 102 for each flow 90. Packets received for a flow 90 are added to the corresponding queue 102 for scheduling and delivery to the destination mobile device 36. Each queue 102 may include upper and lower threshold limits 104 and 106, respectively. The threshold limits 104 and 106 may be based on the SLA, QoS or CoS for the flow 90 and/or the mobile device 36.

The queuing system 82 may implement random early discard (RED), round robin queuing, waited fare queuing (WFQ) or other suitable queuing and congestion control processing for packets in the queues 102. Accordingly, nonconforming and other packets may be dropped from the queues 102 based on the status of the queues in relation to the upper and lower thresholds 104 and 106.

The scheduler 84 controls the timing of packet transmittal on a per sector basis. Packets may be transmitted by the scheduler 84 based on, for example, round robin and waited fare methodology.

The MAS 86 communicates with each sector through the corresponding BSC 32 and BTS 30 to deliver traffic to the mobile devices 36, receive traffic from the mobile devices 36 and to track the location of the mobile devices 36. In one embodiment, the MAS 86 may convert traffic between the wireline and wireless protocols. For example, packets received from the network 50 may be converted to radio frames for transmission in the wireless network 12 and radio frames received from the wireless network 12 may be converted to packets for transmission over the packet network 50. Alternatively, the BSC 32 or other element of the wireless network 12 may convert traffic between the wireline and wireless protocols.

The acknowledgment shapers 88 receive rate control messages 110 from the mobile device 36 through the MAS 86. The rate control messages 110 are feedback messages generated by the mobile device 36 or other suitable end point and provided to the source end point for adjustment of transmission rate. The source comprises the TCP, protocol or other element controlling the transmit rate for the traffic flow. In one embodiment, the rate control messages comprise TCP packet acknowledgment feedback messages. The TCP packet acknowledgment message comprises an acknowledgment for a sequence number and a transmit window size sent by the mobile device 36. A power indicator for a wireless link of the flow 90 is also provided. The acknowledgment messages may be queued in acknowledge queues 112 and shaped by timing and/or modification by the acknowledge shaper 88 based on the power indicator for the wireless link.

The power indicator indicates a power state and/or condition of the wireless link or a device associated with the wireless link. In one embodiment, the power indicator includes an inner power control indicator and an outer power control indicator. The inner power control indicator may comprise a signal power of the mobile device 36 as controlled, monitored and provided by the BTS 30. The outer power indicator may comprise a bit error rate to signal interference ratio measured by the BTS 30 and/or BSC 32. Other suitable indicators of power or other conditions of the wireless link indication of link capacity, usage and/or availability may be used.

In operation, traffic for each flow 90 is generated by a source application at a network device 54 or other source and transmitted across packet network 50 to the air gateway 16. In the source application the transmission rate is controlled by the TCP layer. At the air gateway 16, the packets are received at the NAS 80, marked and forwarded to the queuing system 82.

In the queuing system 82, packets for the flow are queued for delivery to the corresponding mobile device 36. Nonconforming and other packets may be dropped for congestion control. The scheduler 84 forwards packets from the queuing system 82 to the MAS 86 where they are converted to radio frames and forwarded to the wireless network 12 for transmission over the RF link to the mobile device 36.

In response to at least successful receipt of a packet, the TCP protocol layer of an application running on the mobile device 36 generates an acknowledgment message which is forwarded back through the wireless network 12 to the air gateway 16 and queued in the acknowledgment queue 112. Inner and outer power control values for the wireless link are monitored by the wireless network 12 and forwarded to the acknowledgment shaper 88. The acknowledgment shaper 88 holds acknowledgment messages in the queue 112 and paces and/or spaces the messages for delivery to the source end point to effectively control the transmission rate of the source. The acknowledgment shaper 88 may also modify the window size in the acknowledgment message to control source transmission rate. Thus, the acknowledgment shaper 88 may extend the queue time of acknowledgment messages to lower the source transmission rate and reduce hold time and/or send acknowledgment messages out in spurts to increase the source transmission rate. The acknowledgment shaper 88 may also increase the window size indicated by the mobile device 36 to increase the source transmission rate or decrease the window size to decrease the source transmission rate. In a particular embodiment, the acknowledgment shaper 88 may increment the queue time and/or decrement the window size to reduce the source transmission rate based on a high signal level for the mobile device, a low bit energy to interference ratio and/or other indicator of high error or interference. Conversely, the acknowledgment shaper 88 may increase the rate of acknowledgment message transmission, decrement queue time and/or increment the size of the control window to increase the source transmission rate based on low mobile signal power, high bit energy to the interference ratio and/or other indicator of low error or interference. Thus, the acknowledgment shaper 88 may continually shape and modify the acknowledgment messages based on current conditions of the wireless link.

Figure 3:
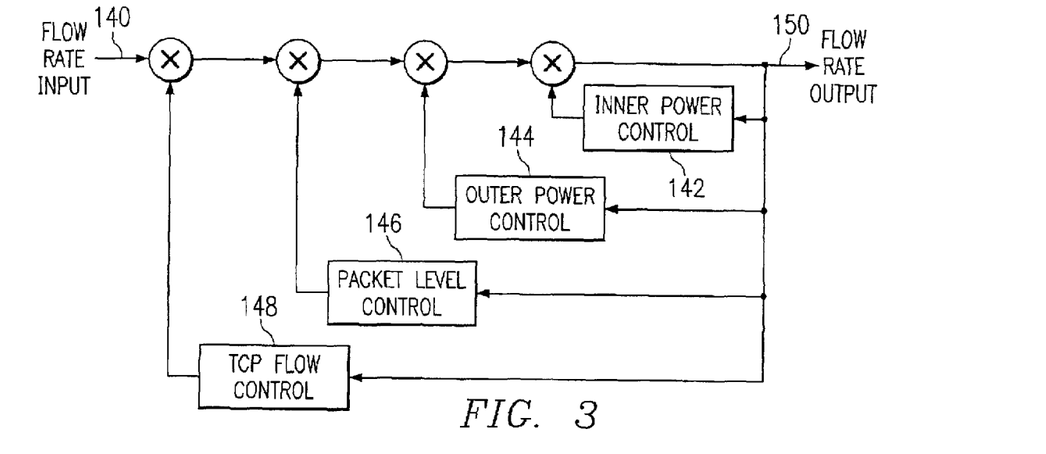
FIG. 3 is a block diagram illustrating feedback control loops for integrated traffic management for a flow in accordance with one embodiment of the present invention.

FIG. 3 illustrates feedback for rate control of a flow extending over a wireless link in accordance with one embodiment of the present invention. In this embodiment, basic rate control is provided by TCP messaging between end points of the flow.

Referring to FIG. 3, a flow rate input 140 is initially set by source application based on parameters negotiated during connection setup. During the duration of the connection, the input flow rate is continually or periodically adjusted based on an inner power control 142, an outer power control 144, a packet level control 146 and a TCP flow control 148 to generate a flow rate output 150.

The inner power control 142 may comprise a signal power of the mobile device 36 terminating the flow or other direct indicator of power for the RF link with the mobile device 36. The inner power control 142 feedback may be provided, and thus updated every 1–2 milliseconds.

The outer power control 144 comprises a link error rate and/or interference indicator for the wireless link and may account for soft handoff power. In one embodiment, the outer power control 144 utilizes a bit error rate to signal interference ratio for the wireless link. In this embodiment, feedback may be provided every 50–100 milliseconds.

Together, the inner and outer power control loops 142 and 144 provide feedback based on signal strength of the RF link. The signal strength indicators may be measured by the BTS 30 and/or BSC 32 and provided to the air gateway 10 for rate control.

The packet level control 146 may be provided by the queuing system 82 in the air gateway 16. The packet level control 146 may be provided by other differential service treatment without departing from the scope of the present invention. The packet level control feedback may be provided every several hundred milliseconds.

The TCP flow control 148 may be provided through the acknowledge messages between the TCP source and termination end points of each flow 90. The acknowledgment messages are fed back to the source and used by the source to adjust the transmission rate for the flow. The inner and outer power controls 142 and 144 shape the timing and/or content of the acknowledgment messages to provide integrated traffic management and rate control.

Figure 4:
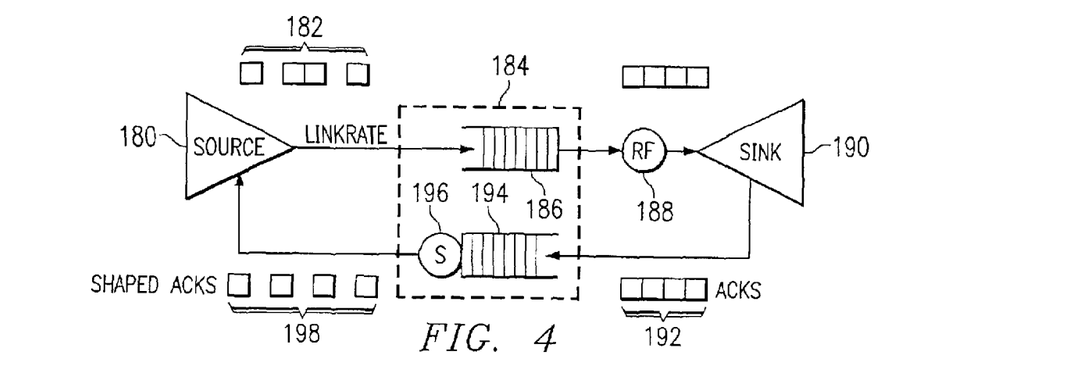
FIG. 4 is a block diagram illustrating end-to-end rate control for a traffic flow across the communication system of FIG. 1 in accordance with one embodiment of the present invention.

FIG. 4 illustrates end-to-end rate control for a flow across the communication system 10 in accordance with one embodiment of the present invention. In this embodiment, rate control is provided by shaped acknowledgment messages in connection with TCP.

Referring to FIG. 4, a source 180 transmits packets 182 across the transport network to the air gateway 184. At the air gateway 184, the packets 182 are queued in a corresponding flow queue 186. From the flow queue 186, the packets are transmitted over an RF link 188 to a mobile end point device, or sink 190.

In response to at least successful receipt of each packet, the sink 190 generates acknowledgment messages 192 for feedback to the source 180. The acknowledgment messages 192 are forwarded to the air gateway 184 and queued in acknowledgment queue 194. The acknowledgment shaper 196 shapes acknowledgments 192 based on a current power indicator for the RF link 188. The shaped acknowledgments 198 are fed back to the source 180 which adjusts transmission rate of the packets based on the shape of the acknowledgments. The shape may be the overall timing between transmission of a packet and receipt of an acknowledgment, the relative timing between acknowledgments and/or set of acknowledgments and/or pacing of the acknowledgments. The shape may also comprise modification of a window, other transmission rate information and/or other content of the acknowledgment messages.

In a particular embodiment, a mean round trip time is estimated for every flow and a throughput calculated for the flow. In this embodiment, a variance of round trip time may also be estimated and the frame loss of the flow calculated. For every packet, the round trip time is measured and arrival rate estimated. Acknowledgments are then paced and window sizes updated based on conditions of the wireless link as measured, estimated and calculated.

The window size in a packet may be adjusted for each packet after calculating the round trip time by multiplying the round trip time by the min-mum allocated bandwidth. The acknowledgment spacing may be a maximum segment size divided by allocated bandwidth. The check sum in a modified packet is updated based on a delta equal to the modification between the receive window size and the adjusted window size.

Figure 5:
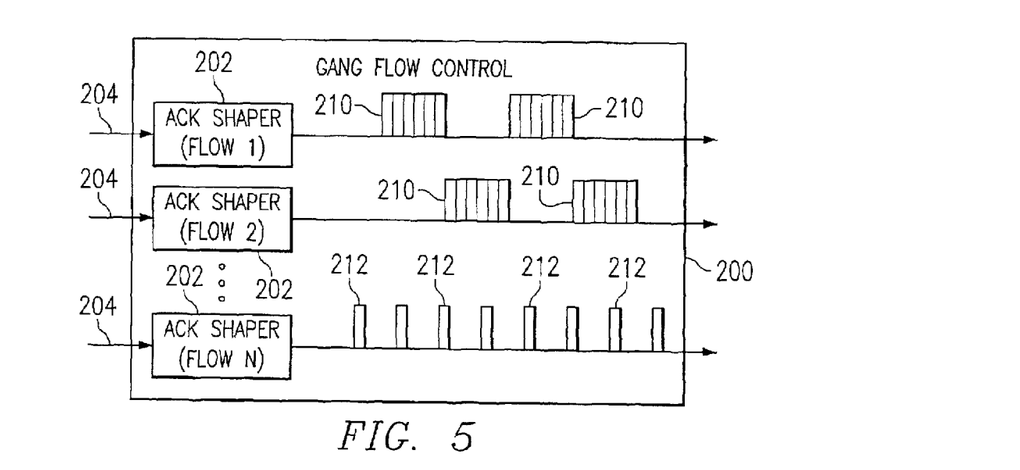
FIG. 5 is a block diagram illustrating gang flow control for a sector of the wireless network of FIG. 1 in accordance with one embodiment of the present invention.

FIG. 5 illustrates a gang flow control 200 for sectors of the wireless network 12 in accordance with one embodiment of the present invention. In this embodiment, flows within each sector are ganged together for feedback control to effect offsetting traffic transmissions and thus result in substantially uniform rates over time within each sector.

Referring to FIG. 5, the gang flow control 200 includes an acknowledgment shaper 202 for each flow 204 within a sector. As previously described in connection with the acknowledgment shaper 88, the acknowledgment shapers 202 may each include an acknowledgment queue for receiving and temporarily storing acknowledgments generated by a corresponding mobile device 36. The acknowledgment shapers 202 receive power indicators for the wireless link of each flow in the sector and cooperate to distribute acknowledgment transmissions across time to effect a substantially constant traffic flow for the sector.

The acknowledgments for each flow may be sent in periodic groups 210 to effect offsetting bursts for the traffic flows. In another embodiment, acknowledgments for each flow may be evenly distributed over time 212 to effect a substantially steady flow rate for each flow.

In one embodiment, for every update interval as related to retransmission time out for the TCP flow, the flows comprising unused bandwidth or in need of additional bandwidth are identified for each TCP gang, or group. The fair share of each TCP flow within the group is calculated and used in incrementing and decrementing the pacing of acknowledgments for the flows within the group. The fair share of each TCP flow may be used in connection with the measured round trip time and arrival estimation time for each flow as previously described.

Figure 6:
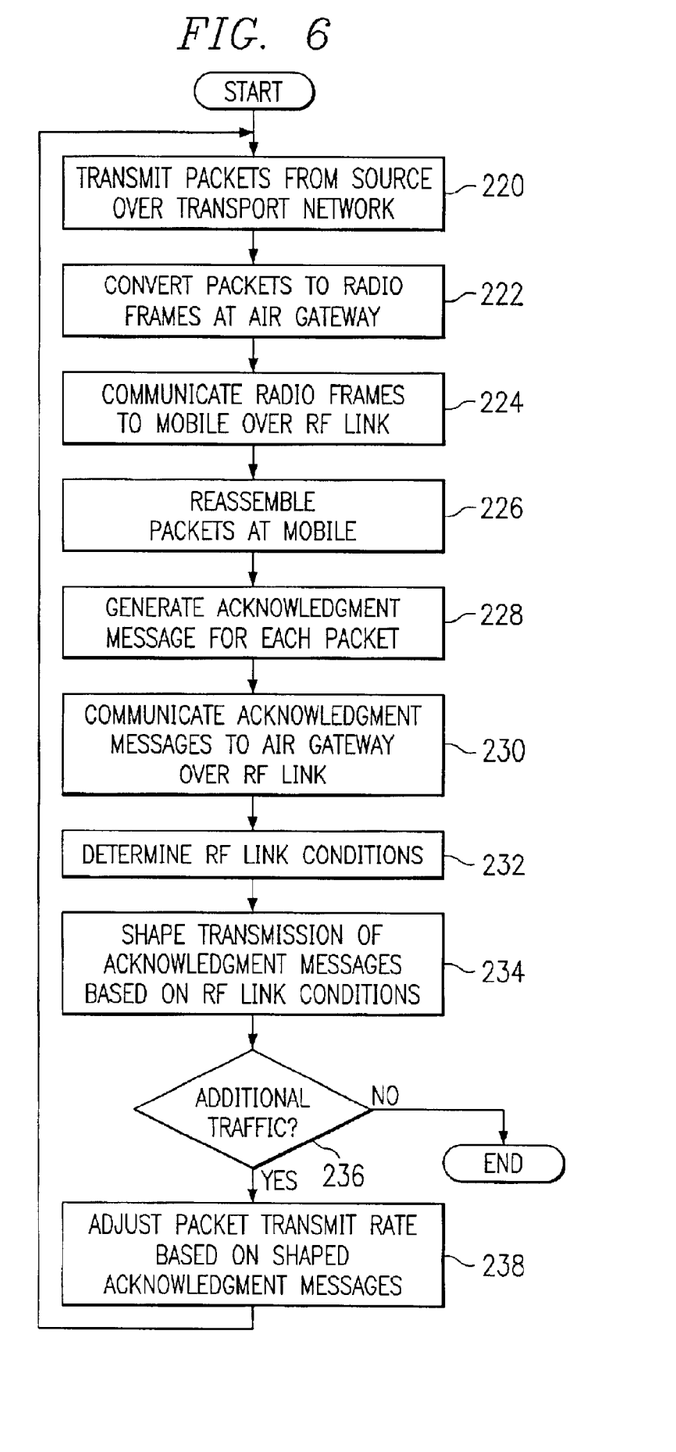
FIG. 6 is a flow diagram illustrating a method for integrated traffic management of a flow across the communication system of FIG. 1 in accordance with one embodiment of the present invention.

FIG. 6 illustrates a method for integrated traffic management across the communication system 10 in accordance with one embodiment of the present invention. In this embodiment, traffic is transmitted in a TCP flow across a wire line link of the packet network 50 and an RF link of the wireless network 12.

Referring to FIG. 6, the method begins at step 200 in which packets are transmitted from a source over the transport network 50. Next, at step 222, the packets are converted to radio frames at the air gateway 16. As previously described, the packets may be converted into radio frames by the MAS 86.

Proceeding to step 224, the radio frames are communicated to the mobile device 36 over an RF link. At step 226, the packets are resembled at the mobile device 36 from the radio frames. An acknowledgment message is generated in response to successful receipt of each packet.

Next, at step 230, the acknowledgment messages are communicated to the air gateway 16 over the RF link. The acknowledged messages may be stored in the acknowledgement queues 112 of the acknowledgement shapers 88. At step 232, power indicators or conditions of the RF link are determined. As previously described power indicators of the RF link may be determined based on the signal strength of the mobile device 36, error to interference ratios, error rate or information and/or other power indicators for the link.

At step 234, transmission of the acknowledgments are shaped based on the RF link conditions. In one embodiment, transmission may be delayed to slow down the source transmission rate for the flow or a set of acknowledgments may be sent at once to increase and/or burst the transmission rate. The acknowledgments may also be evenly distributed or otherwise suitably paced to effect a substantially uniform transmission rate from the source. In addition, the content of the acknowledgment messages may be modified to effect source transmission rate changes.

Proceeding to decisional step 236, if additional traffic remains to be transmitted for the flow, the Yes branch leads to step 238 in which the source adjusts its packet transmission rate based on the shaped acknowledgment messages received back over the communication system 10. For example, the source transmission rate may increase the transmission rate based on an increased window size in an acknowledgment message or in response to at least receiving closely spaced and/or fast arriving acknowledgment responses. Step 238 returns to step 220 in which packets continue to be transmitted over the system 10 and the transmission rate adjusted based and accounting for the condition of the wireless link. At the end of traffic transmission for the flow, the on branch of decisional step 236 leads to the end of the process. In the way, TCP flow control is adapted to wireless—specific conditions and directly and/or indirectly controlled by the congestion and/or interference state of the wireless links.

Though the present invention has been described in several embodiments, various changes and modifications may be suggested to one skilled in the art. It is intended that the present invention encompass such changes and modifications as falls within the scope of the appended claims and their equivalence.

What is claimed is:

1. A method of integrated rate control for a traffic flow, comprising:

determining a power indicator for a wireless link of a traffic flow between a source and a mobile device; and shaping based on the power indicator delivery of a feedback message generated by the mobile device to control the source transmit rate of the traffic flow, wherein the power indicator includes an inner power control indicator and an outer power control indicator, the inner power control indicator comprising a signal power of the mobile device, and the outer power control indicator comprising a bit error rate to signal interference ratio.

2. The method of claim 1, further comprising adapting a transmission rate of the traffic flow at the source based on delivery of the feedback message.

3. The method of claim 1, wherein the feedback message comprises a transport control protocol (TCP) control message.

4. The method of claim 3, wherein the TCP control message comprises a packet delivery acknowledgment message.

5. The method of claim 1, wherein shaping delivery of the feedback message comprises temporarily holding the feedback message from transmission to the source.

6. The method of claim 1, further comprising:

queuing the feedback message at an air gateway; and transmitting the feedback message to the source at a rate based on the power indicator for the wireless link.

7. The method of claim 1, further comprising shaping delivery of the feedback message to the source based on the power indicator and a location of the mobile device.

8. The method of claim 1, further comprising shaping delivery of the feedback message to the source based on the power indicator and a sector of the mobile device.

9. The method of claim 1, further comprising shaping delivery of the feedback message to the source based on the power indicator and an interference of the mobile device with other mobile devices.

10. A system of integrated rate control for a traffic flow, comprising:

means for determining a power indicator for a wireless link of a traffic flow between a source and a mobile device; and means for shaping based on the power indicator delivery of a feedback message generated by the mobile device to control the source transmit rate of the traffic flow, wherein the power indicator includes an inner power control indicator and an outer power control indicator, the inner power control indicator comprising a signal power of the mobile device, and the outer power control indicator comprising a bit error rate to signal interference ratio.

11. The system of claim 10, further comprising means for adapting a transmission rate of the traffic flow at the source based on delivery of the feedback message.

12. The system of claim 10, wherein the feedback message comprises a transport control protocol (TCP) control message.

13. The system of claim 12, wherein the TCP control message comprises a packet delivery acknowledgment message.

14. The system of claim 10, wherein means for shaping delivery of the feedback message comprises means for temporarily holding the feedback message from transmission to the source.

15. The system of claim 10, further comprising:

means for queuing the feedback message at an air gateway; and means for transmitting the feedback message to the source at a rate based on the power indicator for the wireless link.

16. The system of claim 10, further comprising means for shaping delivery of the feedback message to the source based on the power indicator and a location of the mobile device.

17. The system of claim 10, further comprising means for shaping delivery of the feedback message to the source based on the power indicator and a sector of the mobile device.

18. The system of claim 10, further comprising means for shaping delivery of the feedback message to the source based on the power indicator and an interference of the mobile device with other mobile devices.

19. A system of integrated rate control for a traffic flow, comprising:

logic encoded in media; and the logic operable to determine a power indicator for a wireless link of a traffic flow between a source and a mobile device and to shape based on the power indicator delivery of a feedback message generated by the mobile device to control the source transmit rate of the traffic flow, wherein the power indicator includes an inner power control indicator and an outer power control indicator, the inner power control indicator comprising a signal power of the mobile device, and the outer power control indicator comprising a bit error rate to signal interference ratio.

20. The system of claim 19, the logic further operable to adapt a transmission rate of the traffic flow at the source based on delivery of the feedback message.

21. The system of claim 19, wherein the feedback message comprises a transport control protocol (TCP) control message.

22. The system of claim 21, wherein the TCP control message comprises a packet delivery acknowledgment message.

23. The system of claim 19, the logic operable to shape delivery of the feedback message by temporarily holding the feedback message from transmission to the source.

24. The system of claim 19, the logic further operable to queue the feedback message at an air gateway and to transmit the feedback message to the source at a rate based on the power indicator for the wireless link.

25. The system of claim 19, the logic further operable to shape delivery of the feedback message to the source based on the power indicator and a location of the mobile device.

26. The system of claim 19, the logic further operable to shape delivery of the feedback message to the source based on the power indicator and a sector of the mobile device.

27. The system of claim 19, the logic further operable to shape delivery of the feedback message to the source based on the power indicator and an interference of the mobile device with other mobile devices.

28. A method of integrated traffic management for a traffic flow extending across a wireline link in a wireless link, comprising:

receiving packets at a mobile device from a traffic flow extending across a wireline link and a wireless link;

generating at the mobile an acknowledgment message for each packet in response to at least successful receipt of the packet;

at least periodically determining a current power indicator for the wireless link, the power indicator comprising a signal power of the mobile device and an error rate to interference ratio;

controlling a transmission rate of the acknowledgment messages back to a source of the traffic flow based on the current power indicator; and controlling a transmission rate of traffic from the source for the traffic flow based on the transmission rate of the acknowledgment messages, wherein the power indicator includes an inner power control indicator and an outer power control indicator, the inner power control indicator comprising a signal power of the mobile device, and the outer power control indicator comprising a bit error rate to signal interference ratio.

29. A method of integrated rate control for a traffic flow, comprising:

determining a power indicator for a wireless link of a traffic flow between a source and a mobile device; and receiving a feedback message generated by the mobile device for control of the source transmit rate of the traffic flow; and altering a window size in the feedback message based on the power indicator to control the source transmit rate of the traffic flow based on conditions of the wireless link, wherein the power indicator includes an inner power control indicator and an outer power control indicator, the inner power control indicator comprising a signal power of the mobile device, and the outer power control indicator comprising a bit error rate to signal interference ratio.

30. The method of claim 29, further comprising shaping delivery of the feedback message based on the power indicator.

* * * * *